(12) United States Patent
Ren

(10) Patent No.: US 9,871,331 B2
(45) Date of Patent: Jan. 16, 2018

(54) MODULAR SWITCHGEAR CONNECTION AND METHOD OF ELECTRICALLY CONNECTING A MODULAR COMPARTMENT TO A SWITCHGEAR ASSEMBLY

(71) Applicants: GENERAL ELECTRIC COMPANY, Schenectady, NY (US); Xuhui Ren, Shanghai (CN)

(72) Inventor: Xuhui Ren, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 20 days.

(21) Appl. No.: 14/763,552

(22) PCT Filed: Jan. 31, 2013

(86) PCT No.: PCT/CN2013/071181
§ 371 (c)(1),
(2) Date: Jul. 27, 2015

(87) PCT Pub. No.: WO2014/117354
PCT Pub. Date: Aug. 7, 2014

(65) Prior Publication Data
US 2015/0357774 A1    Dec. 10, 2015

(51) Int. Cl.
*H01R 25/16* (2006.01)
*H01R 9/18* (2006.01)
(Continued)

(52) U.S. Cl.
CPC .............. *H01R 25/162* (2013.01); *H01R 9/18* (2013.01); *H01R 43/20* (2013.01); *H02B 1/21* (2013.01);
(Continued)

(58) Field of Classification Search
CPC ........ H01R 25/162; H01R 9/18; H01R 43/20; H02B 1/21; H02B 11/04; Y10T 29/4921
(Continued)

(56) References Cited

U.S. PATENT DOCUMENTS 2,443,545 A * 6/1948 Schwennesen ...... H01B 17/305
                                                          174/153 R
2,788,386 A * 4/1957 McCarty .............. H01B 17/306
                                                          16/2.1
(Continued)

FOREIGN PATENT DOCUMENTS

CN      101651300 A      2/2010
CN      101834082 A      9/2010
(Continued)

OTHER PUBLICATIONS

Secogear, "P/V II-12 Air Insulated Switchgear" GE Industrial Solutions, pp. 1-23, Jan. 16, 2011.
(Continued)

*Primary Examiner* — Edwin A. Leon
*Assistant Examiner* — Oscar Jimenez
(74) *Attorney, Agent, or Firm* — GE Global Patent Operation; Stephen G. Midgley

(57) ABSTRACT

A modular switchgear electrical connection for use with a modular compartment includes a branch busbar having a busbar aperture defined by the branch busbar. Also included is a connection arrangement for establishing an electrical connection with the branch busbar. The connection arrangement includes a fastener extending through the busbar aperture toward the modular compartment. The connection arrangement also includes a spout including a base wall and a cavity defined by at least one wall extending from the base wall, wherein the base wall includes a spout aperture for receiving the fastener. The connection arrangement further
(Continued)

includes a contact component including a base portion a cylindrical portion extending from the base portion, the contact component defining an aperture for receiving the fastener, the contact component secured to the spout and the fastener with a nut for engaging the fastener.

18 Claims, 5 Drawing Sheets

(51) Int. Cl.
 *H01R 43/20* (2006.01)
 *H02B 11/04* (2006.01)
 *H02B 1/21* (2006.01)
 *H02B 3/00* (2006.01)
(52) U.S. Cl.
 CPC ............... *H02B 11/04* (2013.01); *H02B 3/00* (2013.01); *Y10T 29/4921* (2015.01)
(58) Field of Classification Search
 USPC ........ 439/212, 213, 805, 810, 814; 361/605, 361/611, 624, 641, 648; 174/88 B, 71 B
 See application file for complete search history.

(56) References Cited

U.S. PATENT DOCUMENTS

| | | | |
|---|---|---|---|
| 2,897,472 A * | 7/1959 | O'Brien | H02K 5/225 174/153 R |
| 3,242,276 A | 3/1966 | Dakin et al. | |
| 3,277,252 A | 10/1966 | Beddoe et al. | |
| 3,287,532 A * | 11/1966 | Boseley | H01H 9/085 200/507 |
| 4,181,396 A | 1/1980 | Olashaw | |
| 4,272,798 A | 6/1981 | Merola | |
| 4,351,990 A | 9/1982 | Hesselbart et al. | |
| 4,684,191 A * | 8/1987 | Feher | H01R 25/142 439/246 |
| 5,589,669 A * | 12/1996 | Downes | H01R 12/58 174/250 |
| 5,677,656 A * | 10/1997 | Mauch | H01H 51/065 335/126 |
| 6,061,230 A * | 5/2000 | Mazzella | H02B 1/21 174/70 B |
| 6,411,500 B1 | 6/2002 | Kaaden et al. | |
| 7,473,116 B2 | 1/2009 | Dudhwala et al. | |
| 8,379,374 B2 * | 2/2013 | Keegan | H01R 25/142 174/68.2 |
| 8,456,807 B2 * | 6/2013 | Tallam | H01F 27/04 174/68.2 |
| 8,619,411 B2 * | 12/2013 | Rodrigues | H02B 1/21 174/68.2 |
| 2006/0120026 A1 * | 6/2006 | Wiant | H02B 1/21 361/614 |
| 2016/0197459 A1 * | 7/2016 | Motta | H02B 1/26 361/611 |

FOREIGN PATENT DOCUMENTS

| | | |
|---|---|---|
| CN | 201956583 U | 8/2011 |
| EP | 1927170 B1 | 5/2011 |
| GB | 1139594 A | 1/1969 |

OTHER PUBLICATIONS

PCT Search Report issued in connection with corresponding Application No. PCT/CN2013/071181 dated Jul. 11, 2013.

* cited by examiner

MODULAR SWITCHGEAR CONNECTION AND METHOD OF ELECTRICALLY CONNECTING A MODULAR COMPARTMENT TO A SWITCHGEAR ASSEMBLY

BACKGROUND OF THE INVENTION

The subject matter disclosed herein relates to switchgears, and more particularly to a modular switchgear connection, as well as a method of electrically connecting a modular compartment to a switchgear assembly.

Switchgear assemblies typically include a plurality of compartments for housing a variety of electrical components that provide necessary functions for overall operation of the switchgear assembly. The various electrical components require an electrical connection to a main busbar circuit of the switchgear assembly, typically via one or more connectors located in a rear portion of the compartment that facilitates an electrical connection to a busbar. The connector(s) often include a spout that functions as an insulator/bushing system at the back of the compartment, which allows contact connections of the electrical component, such as a circuit breaker, for example, to be plugged into the busbar.

The switchgear assemblies may require removal of the compartments for numerous reasons, including preventative maintenance and installation of a new compartment type. Unfortunately, to establish an electrical connection between the busbar and the connectors of the compartment, the busbar is typically mounted at an interior region of the spout, such that removal and installation is cumbersome. An additional challenge associated with removal and installation of the compartments relates to the location of the connectors. As noted above, the connectors are typically present proximate the rear of the compartment, such that removal from the back of the compartment is necessary. The switchgear assemblies are often disposed against a wall, thereby compounding the removal and installation process challenges.

BRIEF DESCRIPTION OF THE INVENTION

According to one aspect of the invention, a modular switchgear connection for use with a modular compartment includes a branch busbar defining a busbar aperture. Also included is a connection arrangement for establishing an electrical connection with the branch busbar. The connection arrangement includes a fastener extending through the busbar aperture toward the modular compartment. The connection arrangement also includes a spout including a base wall and a cavity defined by at least one wall extending from the base wall, wherein the base wall includes a spout aperture for receiving the fastener. The connection arrangement further includes a contact component including a base portion and a cylindrical portion extending from the base portion, the contact component defining an aperture for receiving the fastener, the contact component secured to the spout and the fastener with a nut for engaging the fastener.

According to another aspect of the invention, a method of electrically connecting a modular compartment to a switchgear assembly is provided. The method includes inserting a fastener through a busbar aperture of a branch busbar. Also included is aligning a spout disposed on the modular compartment with the fastener for receiving the fastener through a spout aperture. Further included is disposing a base portion of a contact component within a recess proximate a base wall of the spout and disposing the fastener through an aperture of the contact component. Yet further included is securing the contact component and the spout to the branch busbar by engaging a nut with the fastener within the aperture of the contact component.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
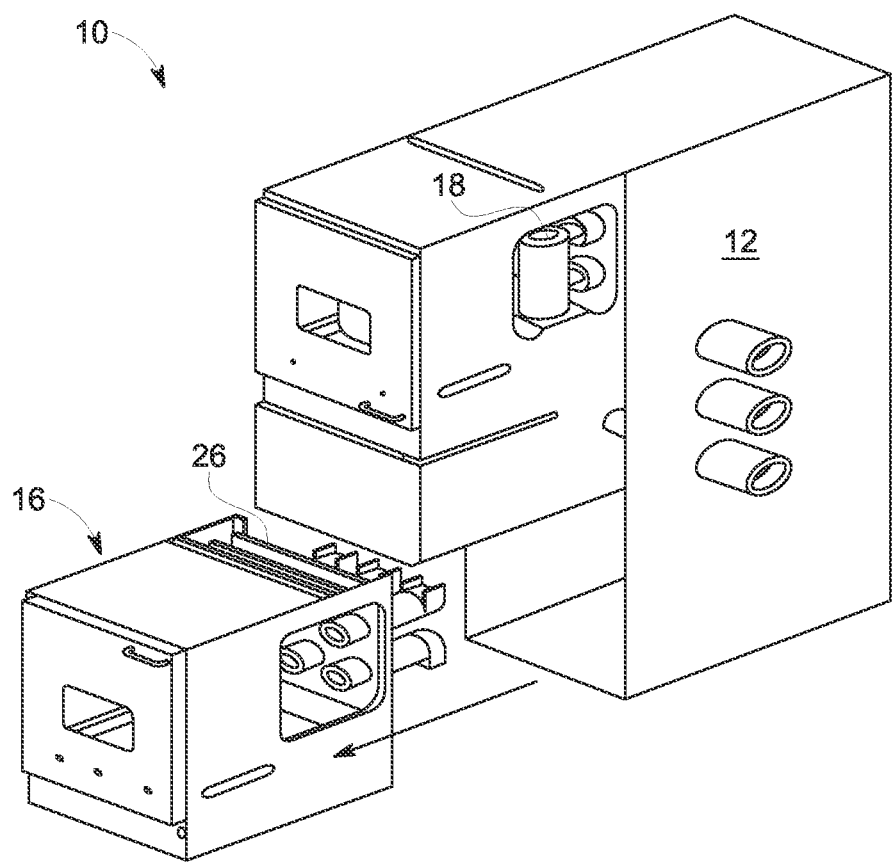
FIG. 1 is a perspective view of a switchgear assembly having a modular compartment.
Figure 2:
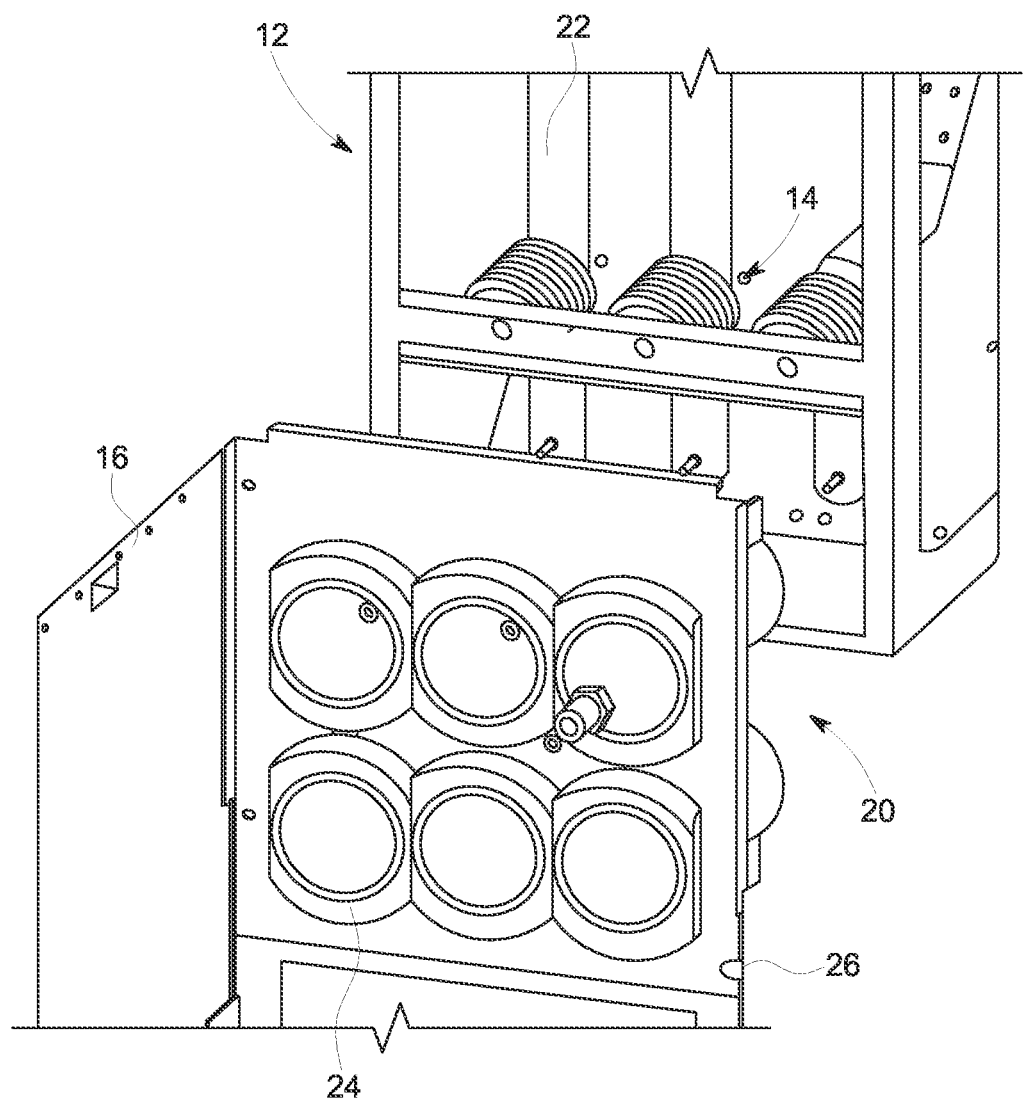
FIG. 2 is a perspective view of a connection arrangement for the modular compartment.
Figure 3:
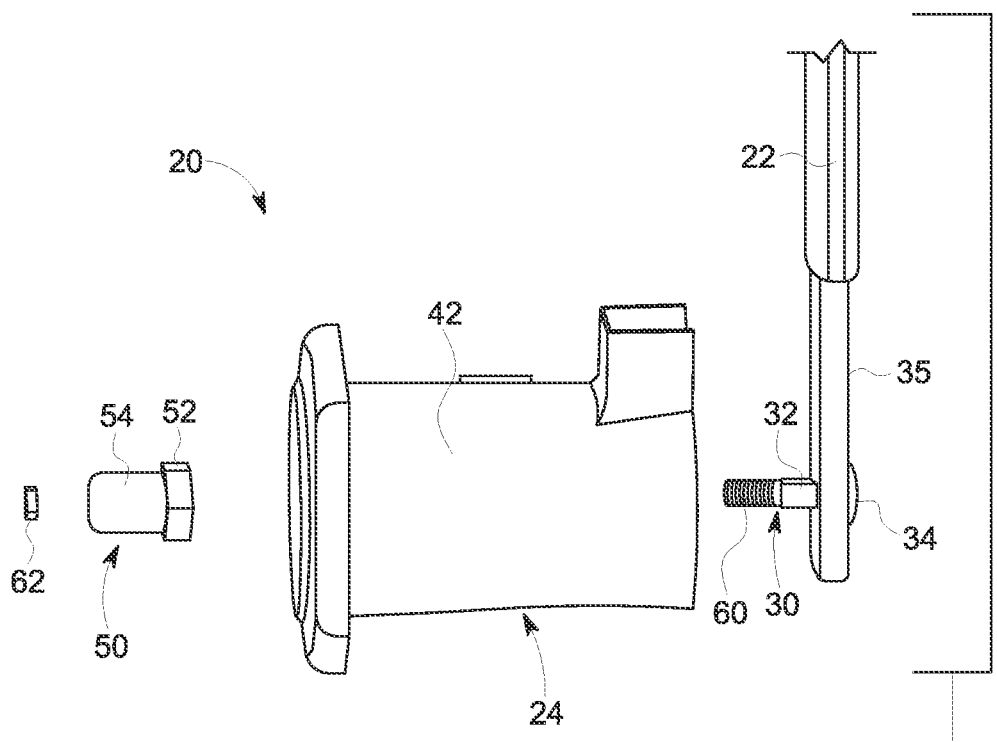
FIG. 3 is a side elevational, exploded view of the connection arrangement.
Figure 4:
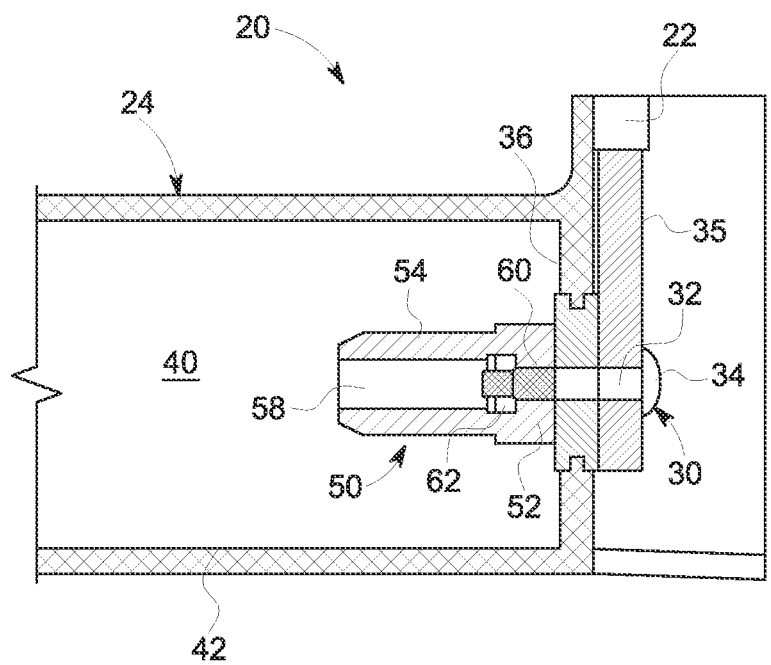
FIG. 4 is a cross-sectional view of the connection arrangement.
Figure 5:
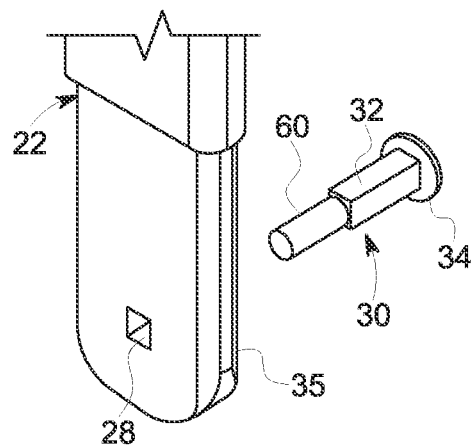
FIG. 5 is a perspective view of a fastener and a busbar of the connection arrangement.
Figure 6:
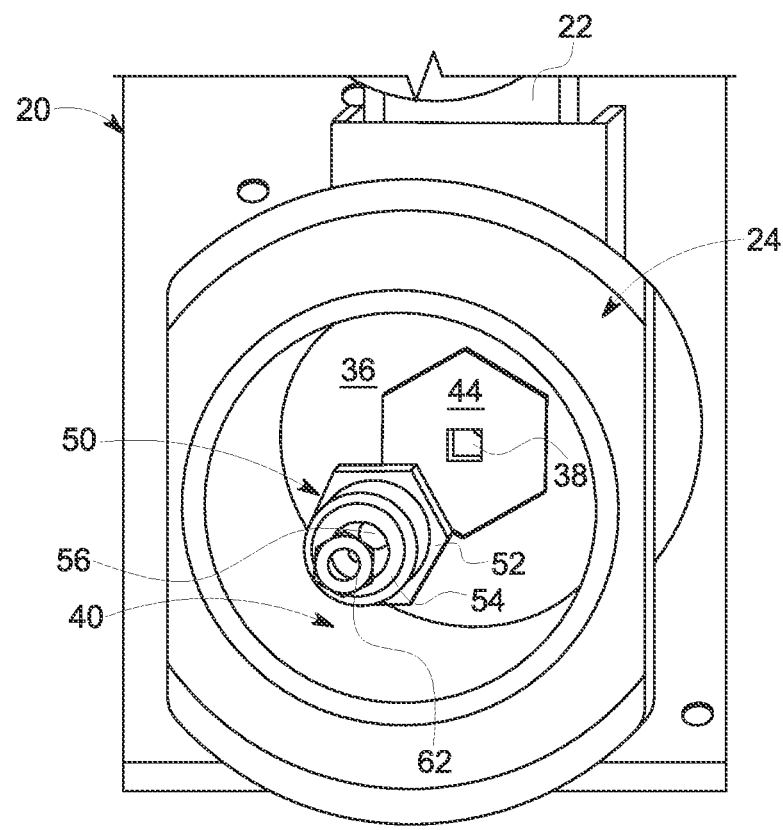
FIG. 6 is a front, perspective view of the connection arrangement.

Referring to FIGS. 1 and 2, a switchgear assembly 10 is illustrated and includes a main busbar circuit portion 12 housing a plurality of electrical components 14 for routing power throughout the switchgear assembly 10. A modular compartment 16 is illustrated in a removed position from the remainder of the switchgear assembly 10 and, as shown, a plurality of compartments is typically included in the switchgear assembly 10. Some or all of the compartments may be of the modular configuration described herein. Each of the compartments, whether modular or not, segregate an electrical device 18 disposed in each compartment from one another, each of the electrical devices performing distinct functions from one another. The segregation improves reliability and overall safety of the switchgear assembly 10. Typical compartments include a low voltage compartment, a circuit breaker compartment, a main bus compartment and cable compartment, for example.

The modular compartment 16 provides simplified removal and installation processes, thereby allowing replacement of the modular compartment 16 with a similar compartment or with a new compartment housing different electrical devices. The modular compartment 16 includes a connection arrangement 20 that is configured to engage and form an electrical connection with the main busbar circuit portion 12. Typically, the electrical connection is facilitated by directly or indirectly coupling the modular compartment 16 to a branch busbar 22 disposed at a location proximate the connection arrangement 20 of the modular compartment 16.

The connection arrangement 20 includes a spout 24 that is typically located proximate a connection side 26 of the modular compartment 16 that is operatively coupled to the branch busbar 22. The spout 24 allows one or more connectors of the electrical device 18 to be plugged into the main busbar circuit portion 12 via the branch busbar 22, thereby electrically connecting the electrical device 18 housed in the modular compartment 16 to the branch busbar 22. As illustrated, the connection arrangement 20 may include a plurality of spouts, however, for clarity of description, a single spout and associated components will be described herein.

Referring now to FIGS. 3-6, the connection arrangement 20 is illustrated in greater detail. The branch busbar 22 includes a busbar aperture 28 configured to receive a fastener 30. The busbar aperture 28 comprises a geometry similar to the geometry of a portion 32 of the fastener 30. In an exemplary embodiment, the busbar aperture 28 and the portion 32 of the fastener 30 are of a non-circular geometry, such that insertion and disposal of the portion 32 of the fastener 30 within the busbar aperture 28 engages the fastener 30 with the busbar aperture 28 in a non-rotatable manner. The term "non-circular" employed above and used below refers to asymmetry with respect to a central axis of an object, such that the radius extending from such a central axis is not uniform. In one embodiment, as illustrated, the busbar aperture 28 and the portion 32 of the fastener 30 comprise a relatively square geometry, however, as noted above, numerous other geometries are suitable for imparting a non-rotational arrangement of the fastener 30 within the busbar aperture 28. The fastener 30 includes a head portion 34 having a perimeter greater than the portion 32 of the fastener 30, such that insertion of the fastener 30 into the busbar aperture 28 leads to a fixed axial position, with respect to a direction of travel toward the modular compartment 16, of the fastener 30 upon engagement of the head portion 34 with a first side 35 of the branch busbar 22. In one embodiment, the head portion 34 comprises a segment of a sphere, which provides a strong electric field to enhance electrical connection between the branch busbar 22 and the modular compartment 16.

The spout 24 includes a base wall 36 having a spout aperture 38 extending through the base wall 36. The spout aperture 38 comprises a geometry similar to that of the busbar aperture 28 and the portion 32 of the fastener 30, such that the fastener 30 is angularly fixed in a non-rotatable position, with respect to the spout 24. The spout 24 also includes a cavity 40 defined by an outer wall 42 extending away from the base wall 36 and the branch busbar 22. In an exemplary embodiment, the outer wall 42 is a hollow cylindrical structure that defines the cavity 40. Within the cavity 40 and disposed proximate the base wall 36 is a recess 44. The recess 44 may be machined or cast into the base wall 36 itself or may be formed in an insert configured to be seated within the cavity 40 along the base wall 36. In the case of an insert, a copper material may be employed. Irrespective of the precise configuration, the recess 44 is shaped to rotationally retain a contact component 50 seated in the recess 44. To achieve rotational retention, the recess 44 and a base portion 52 of the contact component 50 are similarly shaped of a non-circular geometry. As is the case with the non-circular geometry of the busbar aperture 28, the portion 32 of the fastener 30 and the spout aperture 38, numerous non-circular shapes of the recess 44 and the base portion 52 of the contact component 50 may be suitable. In the illustrated embodiment, the non-circular shape comprises a hexagonal shape.

The contact component 50 provides an electrical connection between the branch busbar 22 and the electrical device 18 inserted into the modular compartment 16, and more specifically upon insertion of one or more connectors of the electrical device 18 within the spout 24 for contact with the contact component 50. As described in detail above, the contact component 50 is disposed within the cavity 40 of the spout 24 and rotationally fixed upon insertion of the base portion 52 into the recess 44. The contact component 50 includes a cylindrical portion 54 extending from the base portion 52 with an aperture 56 extending through the base portion 52, leading to a central opening 58 within the cylindrical portion 54. The aperture 56 is configured to receive a threaded portion 60 of the fastener 30, with the threaded portion 60 extending at least partially into the central opening 58. A nut 62 is employed to engage the threaded portion 60 of the fastener 30 for fixedly retaining the spout 24 and the contact component 50 to the branch busbar 22, thereby forming a secure relationship between all components of the connection arrangement 20.

In one embodiment, the nut 62 includes a hexagonal shape that corresponds to a hexagonal recess shaped within the central opening 58. In such an embodiment, the nut 62 is prevented from rotating and loosening over time, which would weaken the electrical connection provided by the connection arrangement 20. Tightening of the connection arrangement 20 is achieved by applying a torque to the head portion 34 of the fastener 30, while the nut 62 is rotationally fixed within the hexagonal recess.

Figure 7:
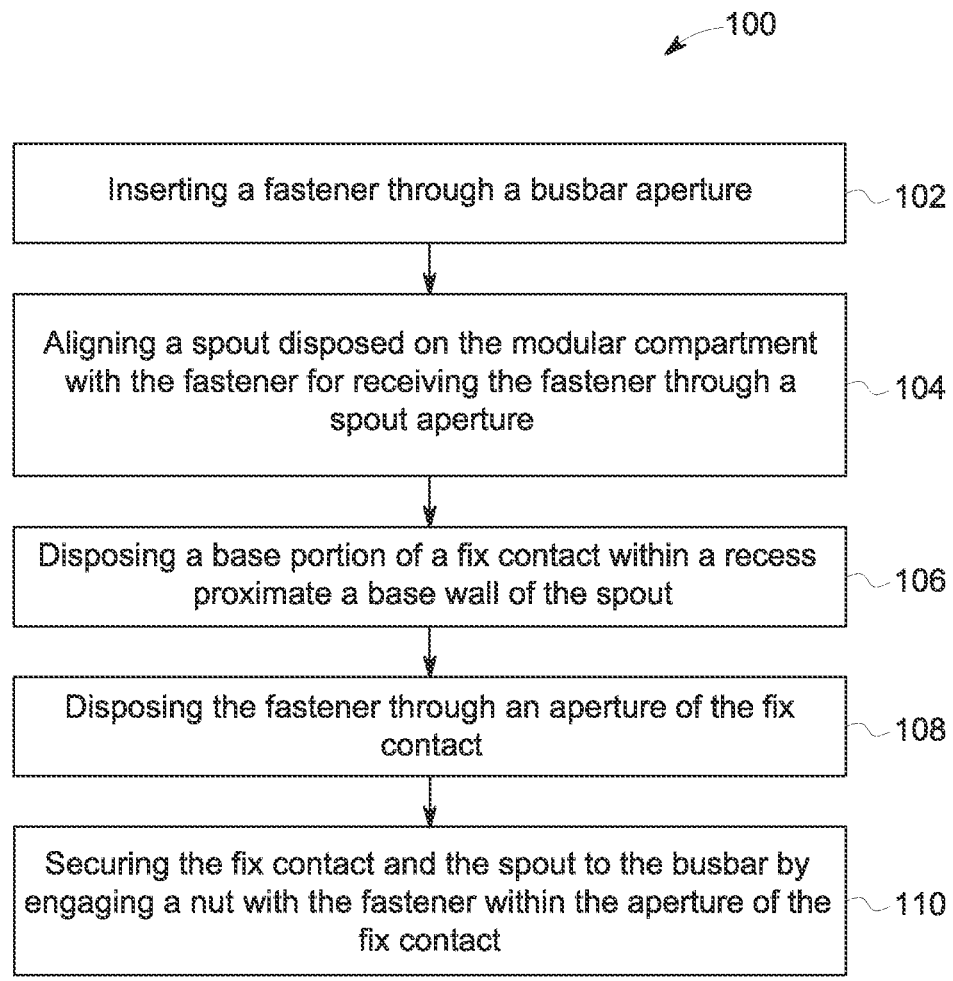
FIG. 7 is a flow diagram illustrating a method of electrically connecting the modular compartment to the switchgear assembly.

As illustrated in the flow diagram of FIG. 7, and with reference to FIGS. 1-6, a method of electrically connecting a modular compartment to a switchgear assembly 100 is also provided. The switchgear assembly 10 and the connection arrangement 20 have been previously described and specific structural components need not be described in further detail. The method of electrically connecting a modular compartment to a switchgear assembly 100 includes inserting a fastener through a busbar aperture of a busbar 102. A spout disposed on the modular compartment is aligned with the fastener for receiving the fastener through a spout aperture 104. A base portion of a contact component is disposed within a recess proximate a base wall of the spout 106 and the fastener is disposed through an aperture of the contact component 108. The contact component and the spout are secured to the busbar by engaging a nut with the fastener within the aperture of the contact component 110.

Advantageously, the connection arrangement 20 improves the installation and removal process required for various compartments of the switchgear assembly 10, thereby providing a modular aspect of the modular compartment 16. Specifically, the modular compartment 16 comprises various arrangements for housing and electrically connecting electrical devices. Simplified replacement and switching of the modular compartment 16 is facilitated by the connection arrangement 20 described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A modular switchgear connection for use with a modular compartment comprising:
    a branch busbar having busbar aperture defined therethrough; and
    a connection arrangement for establishing an electrical connection with the branch busbar, the connection arrangement comprising:
    a fastener electrically coupled to the branch busbar, and extending through the busbar aperture toward the modular compartment;
    an insulative spout including a base wall and a cavity defined by at least one wall extending away from the base wall and the branch busbar, wherein the base wall defines a spout aperture for receiving the fastener; and
    a conductive contact component including a base portion and a cylindrical portion extending from the base portion, the conductive contact component defining an aperture for receiving the fastener, the conductive contact component disposed within the insulative spout cavity, and secured to the insulative spout and the fastener with a nut disposed in the conductive contact component aperture for engaging the fastener.

2. The modular switchgear connection of claim 1, wherein the branch busbar is at least partially disposed within a switchgear main busbar circuit portion and is disposed proximate a connection region for electrically connecting to an electrical device within the modular compartment.

3. The modular switchgear connection of claim 1, further comprising a recess proximate the base wall of the insulative spout for engagingly receiving the base portion of the conductive contact component.

4. The modular switchgear connection of claim 3, wherein the recess and the base portion comprise a non-circular geometry.

5. The modular switchgear connection of claim 3, wherein the recess and the base portion comprise a relatively hexagonal geometry.

6. The modular switchgear connection of claim 3, further comprising a copper insert disposed proximate the base wall of the spout and comprising the recess for receiving the base portion of the conductive contact component.

7. The modular switchgear connection of claim 1, wherein the busbar aperture, the insulative spout aperture and a portion of the fastener comprise a non-circular geometry.

8. The modular switchgear connection of claim 1, wherein the busbar aperture, the insulative spout aperture and, a portion of the fastener comprise a relatively square geometry.

9. The modular switchgear connection of claim 1, wherein the fastener comprises a fastener head shaped of a spherical segment.

10. The modular switchgear connection of claim 1, further comprising a hexagonal recess within the cylindrical portion of the conductive contact component for engagingly receiving the nut, wherein the nut comprises a hexagonal geometry.

11. A method of electrically connecting a modular compartment to a switchgear assembly comprising:
    inserting a fastener through a busbar aperture of a branch busbar;
    electrically coupling the fastener and busbar;
    aligning an aperture defined through a base wall of an insulative spout with the fastener;
    receiving the fastener through the insulative spout aperture;
    disposing a base portion of a conductive contact component within a recess proximate the base wall of the insulative spout and disposing the fastener through an aperture of the conductive contact component; and
    securing the conductive contact component and the insulative spout to the branch busbar by engaging a nut with the fastener within the aperture of the conductive contact component.

12. The method of claim 11, further comprising inserting and disposing a non-circular portion of the fastener within the busbar aperture and the insulative spout aperture, wherein the busbar aperture and the insulative spout aperture are non-circular.

13. The method of claim 12, wherein the busbar aperture, the insulative spout aperture and the non-circular portion of the fastener comprise a relatively square geometry.

14. The method of claim 11, further comprising disposing a copper insert proximate the base wall of the insulative spout, the copper insert having the recess for receiving the base portion of the conductive contact component.

15. The method of claim 14, wherein the base portion of the conductive contact component comprises a non-circular geometry corresponding to a non-circular geometry of the recess.

16. The method of claim 15, wherein the non-circular geometry of the recess and the base portion of the conductive contact component comprises a relatively hexagonal geometry.

17. The method of claim 11, wherein securing the conductive contact component and the insulative spout to the branch busbar comprises engaging the nut with a threaded portion of the fastener.

18. The method of claim 11, wherein the nut comprises a relatively hexagonal geometry, wherein securing the conductive contact component and the insulative spout to the branch busbar comprises disposing the nut within a hexagonal recess of the conductive contact component.

* * * * *